United States Patent [19]
Obara et al.

[11] Patent Number: 5,661,380
[45] Date of Patent: Aug. 26, 1997

[54] METHOD AND APPARATUS FOR OPERATING AN ELECTRIC VEHICLE DRIVE SYSTEM DURING PERIODS OF SENSOR MALFUNCTION

[75] Inventors: Sanshiro Obara, Tokai; Shigeyuki Yoshihara; Hiroyuki Yamada, both of Hitachinaka; Nobunori Matsudaira, Hitachi, all of Japan

[73] Assignees: Hitachi, Ltd.; Hitachi Car Engineering Co., Ltd., both of Japan

[21] Appl. No.: 554,498

[22] Filed: Nov. 7, 1995

[30] Foreign Application Priority Data

Nov. 7, 1994 [JP] Japan .................... 6-271938

[51] Int. Cl.⁶ .................................................. H02P 3/00
[52] U.S. Cl. .................... 318/139; 318/800; 318/434
[58] Field of Search .......................... 318/139, 432, 318/434, 490, 798–815, 599; 180/170, 171, 179, 282, 287; 307/9.1, 10.1, 10.7; 361/23, 24, 33, 31; 388/907

[56] References Cited

U.S. PATENT DOCUMENTS

| | | | |
|---|---|---|---|
| 3,811,526 | 5/1974 | Adahan | 180/77 |
| 4,539,642 | 9/1985 | Mizuno et al. | 364/426 |
| 5,304,912 | 4/1994 | Kajiwara et al. | 318/802 |
| 5,357,181 | 10/1994 | Mutoh et al. | 318/139 |
| 5,371,446 | 12/1994 | Imaseki | 318/807 X |
| 5,414,339 | 5/1995 | Masaki et al. | 318/800 |
| 5,461,531 | 10/1995 | Tuchiya et al. | 361/28 |
| 5,469,032 | 11/1995 | Otake | 318/439 |
| 5,485,375 | 1/1996 | Tamaki et al. | 180/65.8 |

FOREIGN PATENT DOCUMENTS 3-277101  12/1991  Japan.
5-91601   4/1993   Japan.

*Primary Examiner*—Jonathan Wysocki
*Attorney, Agent, or Firm*—Evenson, McKeown, Edwards & Lenahan P.L.L.C.

[57] ABSTRACT

The present invention provides a protection apparatus in a control system for an electric vehicle which is capable of performing back-up driving by using a back-up control method, without using output from sensors even if the sensor in the control system for ordinary driving is failed. When at least one of the current sensor, the speed sensor and the accelerator sensor is detected to be abnormal, a back-up control voltage v1 is output as an abnormal signal from a running back-up control circuit. As a result, the running back-up control circuit sets the limiter of the output of the current control circuit to zero and switches the control signal to the inverter from vector control to V/f voltage control.

6 Claims, 5 Drawing Sheets

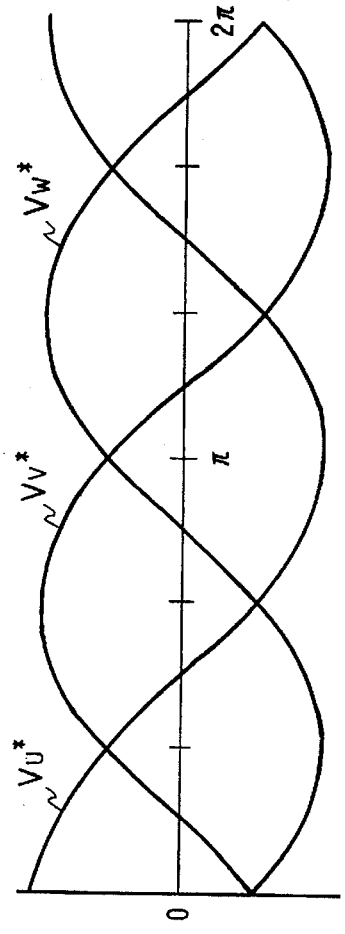
FIG. 4(a) VOLTAGE COMMAND
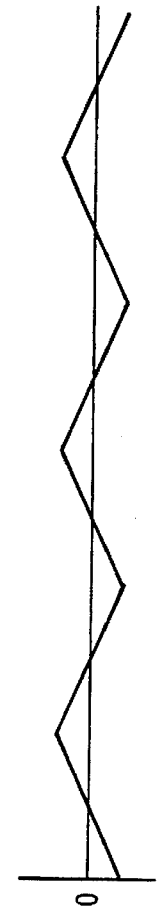
FIG. 4(b) TRIPLE HARMONIC WAVE CORRECTION VOLTAGE
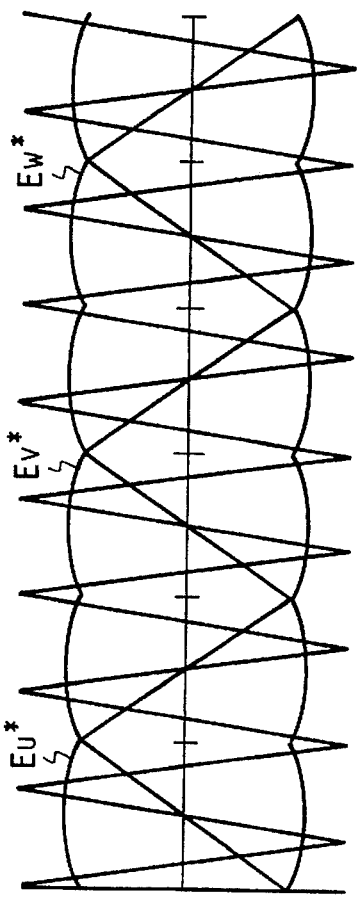
FIG. 4(c) VOLTAGE COMMAND TRIANGULAR WAVE
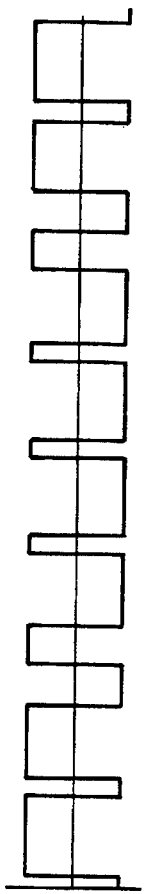
FIG. 4(d) U-PHASE OUTPUT VOLTAGE

METHOD AND APPARATUS FOR OPERATING AN ELECTRIC VEHICLE DRIVE SYSTEM DURING PERIODS OF SENSOR MALFUNCTION

BACKGROUND OF THE INVENTION

The present invention relates to a protection system for an electric vehicle and a protection method, and more particularly relates to a protection apparatus and a protection method suitable for an electric vehicle having a current sensor, a speed sensor and an accelerator sensor.

In recent years, an electric vehicle of the vector control type has become widely used since an induction motor driving the electric vehicle is driven with a high speed and a high accuracy by an inverter. In general, an electric vehicle comprises an inverter for converting a direct current electric power source of a battery to a variable voltage and variable frequency alternating current power source, a three-phase alternating current motor for driving the vehicle, a current sensor and a speed sensor for detecting the current and the rotating speed of the three-phase alternating current motor, a torque command calculating means for determining a torque command of the three-phase alternating current motor based on a degree of opening of an accelerator, a three-phase alternating current command generating means for generating a three-phase alternating current command to control phase current flowing in the windings of the three-phase alternating current motor based on the torque command and the outputs of the current sensor and the speed sensor, and a signal generating means for generating a signal to be applied to the gate of the inverter based on the three-phase alternating current command and the current flowing in the windings of the three-phase alternating current motor.

In such an electric vehicle, the torque control apparatus is constructed based on a torque command sent from a driver through the degree of opening of the accelerator, the current of the motor detected by the current sensor, and the rotating angular speed of the motor detected by the speed sensor. In order to keep the safety of such a torque control apparatus, a technology is disclosed in Japanese Patent Application Laid-Open No. 3-277101 (1991) where sensors are constructed in a dual system, so that it is possible to switch from the sensor in one system to the auxiliary sensor in the other system when the sensor in one system is failed, and the motor is driven based on the information from the auxiliary sensor.

On the other hand, a control system is disclosed in Japanese Patent Application Laid-Open No. 5-91601 (1993) where the control system switches from speed feedback control to V/f control when the speed sensor is failed.

Since probability of occurrence of failure is finite in any system, in a driving system of an electric vehicle it is necessary to provide a system capable of safely stopping and further driving in any case on the assumption of occurrence of any failure.

When the sensors are constructed in a multi-system as described in Japanese Patent Application Laid-Open No. 3-277101 (1991), the reliability of the sensors themselves is improved. However, the reliability of the overall torque control system is not always improved since number of cables and connecting terminals for the detected signals is increased. Further, there are some cases where the auxiliary sensor may also fail, depending on the cause of the failure, or the switching to the auxiliary sensor may involve danger depending on the method of switching.

In order to perform vector control, an accelerator switch for detecting the degree of opening of the accelerator, a current sensor for detecting the current of the three-phase alternating current motor and a speed sensor for detecting the rotating speed of the three-phase alternating current motor are necessary and indispensable. Therefore, when failure occurs in these sensors, vector control becomes inoperative and the torque of the induction motor becomes abnormal, resulting in a dangerous state in the driving of the vehicle. For example, the vector control is performed with feedback of the output from the speed sensor in order to accurately control the speed and the torque. Therefore, the speed sensor is necessary and indispensable. There is a problem in that when the speed sensor is failed, driving of the electric vehicle is dangerous due to the possibility of an excessively large or an excessively small torque, or a negative torque, and a lack of stable control in voltage and/or current.

On the other hand, according to the invention disclosed in Japanese Patent Application Laid-Open No. 5-91601 (1993), the vehicle can be driven and stopped safely even when the speed sensor is failed. However, in this invention, there is a problem in that control becomes inoperative when the current sensor is failed since the output from the current sensor is used in the driving control when the speed sensor is failed.

SUMMARY OF THE INVENTION

An object of the present invention is to provide a protection apparatus in a control system for an electric vehicle which is capable of performing back-up driving by using another control method without using output from sensors even if the sensor in the control system for ordinary driving is failed.

The present invention is characterized by a protection apparatus for an electric vehicle comprising an inverter for converting a direct current electric power source of a battery to a variable voltage and variable frequency alternating current power source, a three-phase alternating current motor for driving the vehicle, a current sensor for detecting the current and a speed sensor for detecting the rotating speed of the three-phase alternating current motor, a torque command calculating means for determining a torque command of the three-phase alternating current motor based on a degree of opening of an accelerator detected by an accelerator sensor, an alternating current command generating means for generating a current command to control the current of the three-phase alternating current motor based on the torque command and the outputs of the current sensor and the speed sensor, a current control means for generating a voltage signal based on the current command and the current flowing in the three-phase alternating motor, and PWM signal generating means for generating a PWM signal to control the inverter based on the voltage signal, wherein the current control means is constructed so that when at least one of the current sensor, the speed sensor and the accelerator sensor is detected to be abnormal, the limiter of the output of the current control means is set to zero and a voltage command is generated based on the back-up control voltage output from the alternating current command generating means, and the PWM signal generating means generates a PWM signal for control the inverter using the voltage command.

According to the present invention, when an abnormal state occurs in the speed sensor, the current sensor or the accelerator sensor, a back-up control voltage v1 is output as an abnormal signal from a running back-up control circuit corresponding to the occurrence of the abnormal state. As a result, the running back-up control circuit sets the limiter of the output of the current control circuit to zero and switches the control signal to the inverter from vector control to V/f voltage control.

Then since the inverter is brought to the V/f control state to control the speed of the alternating motor, the vehicle can continue to run in a minimum necessary condition without using the output of the sensor.

BRIEF DESCRIPTION OF THE DRAWINGS

FIG. 4 is a chart explaining the operation of the controller of FIG. 2.

DETAILED DESCRIPTION OF THE PREFERRED EMBODIMENTS

An embodiment according to the present invention will be described below, referring to the block diagram of the control system for an electric vehicle of FIG. 1.

Figure 1:
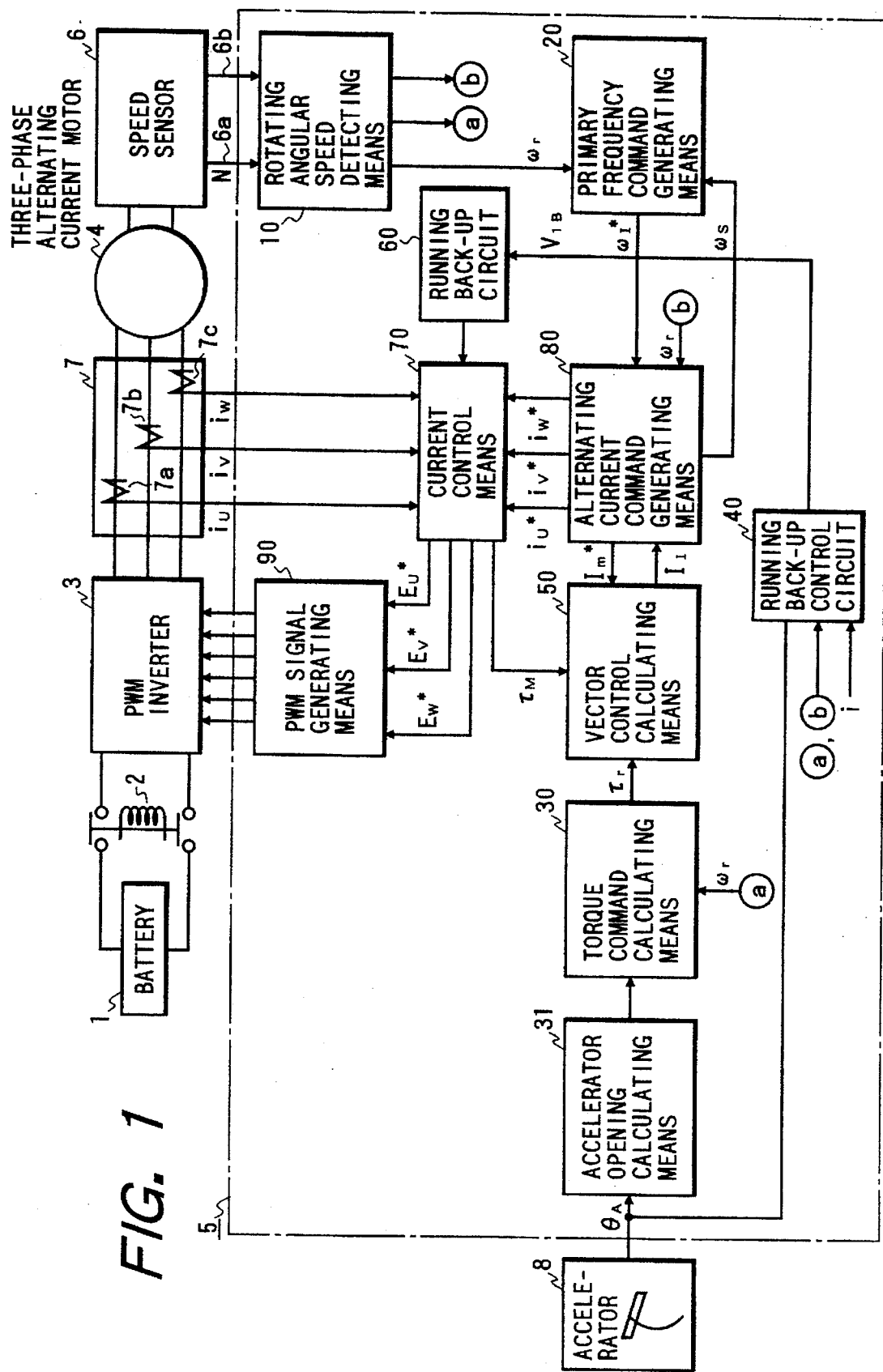
FIG. 1 is a block diagram of an embodiment of a control system for an electric vehicle in accordance with the present invention.

In FIG. 1, the reference character 1 is a main electric source of a battery of an electric vehicle, the reference character 2 is a main contactor for opening and closing the main circuit, the reference character 3 is an inverter for converting the direct current of the battery 1 to alternating current using power switching elements, the reference character 4 is a three-phase alternating current motor for driving the electric vehicle, the reference character 5 is a controller, and the reference character 6 is a speed sensor for detecting the rotating speed N of the motor 4. The reference character 7 (7a, 7b, 7c) is current sensor which detects the primary current i (iu, iv, iw) of the three-phase alternating current flowing the primary winding of the alternating current motor 4. The reference character 8 is an accelerator sensor for outputting an output θA corresponding to the degree of stepping-in when the accelerator pedal is stepped. The accelerator sensor 8 is constructed so as to detect the full closed state and the idling state of the accelerator.

The controller 5 comprises a rotating speed detecting means 10, a primary frequency command generating means 20, a torque command calculating means 30, an accelerator opening calculating means 31, a running back-up control circuit 40, a vector control calculating means 50, a running back-up circuit 60, a current control means 70, an alternating current command generating means 80 and a PWM signal generating means 90.

In the normal state, the controller 5 receives rotating speed N of the motor, motor current i and degree of opening θA of the accelerator. In the torque command calculating means 30 a torque command τr is calculated based on θ and the rotating angular speed ωr. The primary frequency command generating means 20 calculates a primary angular frequency $\omega_1^*$, while the vector control calculating means 50 generates a torque current command It* and an excitation current command Im* based on an exciting motor command im and a motor torque τM. In the current control means 70 a torque current It and an excitation current Im are obtained through d-q converting the three-phase alternating currents iu, iv, iw detected by the current sensors 7a, 7b, 7c supplied by the alternating current command generating means. In alternating current command calculating means 80 standard signals Eu*, Ev*, Ew* for obtaining the motor toque τM are generated by executing alternating voltage command calculating process using the primary angular frequency $\omega_1^*$, the alternating current command $I_1$ and so on, and a PWM signal is output from the PWM signal generating means 90. A variable frequency and variable voltage three-phase alternating voltage is formed from the direct current of the battery 1 using the inverter driven based on the PWM signal to control the torque of the three-phase alternating current motor 4.

In the running back-up control circuit 40 it is judged whether each of the sensors is normal or not. As for the speed sensor 6, the two outputs 6a and 6b are compared, and if there is no substantial difference between them, it is judged to be normal. If there is a difference, it is judged to be abnormal. As for the current sensor 7, if the sum of the primary current i (iu, iv, iw) is zero, (that is, iu+iv+iw=0), it is judged to be normal. If iu+iv+iw≠0, it is judged to be abnormal. As for the accelerator sensor 8, if there is no output form the accelerator sensor expressing the degree of step-in even when the idling switch or the accelerator switch is in ON-state (turning to ON-state when the accelerator pedal is stepped), it is judged to be abnormal. On the contrary, if there is an output form the accelerator sensor even when the idling switch or the accelerator switch is in OFF-state, it is also judged to be abnormal.

When an abnormality occurs in any one of the speed sensor 6, the current sensor 7 and the accelerator sensor 8, an abnormal signal is output from the running back-up control circuit 40 to change the control to running back-up mode. Thereafter, the running back-up circuit 60 performs V/f control of the three-phase alternating current motor 4 based on the idling signal of the accelerator sensor.

During ordinary running, the motor torque τM is obtained from the following equation using the torque current It and an excitation current Im obtained through d-q converting the three-phase alternating currents iu, iv, iw detected by the current sensors 7.

$$\tau M = (3/2) \cdot P \cdot (M^2/(M+l_2)) \cdot Im \cdot It \qquad (1)$$

where

P: number of poles

M: excitation inductance $l_2$: secondary leakage inductance.

Then in the vector control calculating means 50 an alternating current command $L_1$ is calculated based on the torque current command It* and the excitation current command Im*.

In a magnetic flux pattern generator of the alternating current command generating means 80, a magnetic flux φR* to be generated in the secondary circuit of the motor 4 is generated corresponding to the rotating angular speed ωr obtained through the rotating angular speed detecting means 10. A secondary magnetic flux command φ* can be obtained by multiplying a load factor α expressed in the following equation (2) to the magnetic flux φR*.

$$\alpha = It^*/It0 \qquad (2)$$

where

It0: rated torque current.

Next, the difference between the secondary magnetic flux command $\phi^*$ and a secondary magnetic flux $\phi_2$ generated in the secondary circuit of the alternating current motor 4 is estimated by the following equation (3) is obtained to generate the excitation current command Im*.

$$\phi_2 = (M \cdot Im^*)/(1 + T_2 \cdot s) \quad (3)$$

where $T_2 (=(M+l_2)/r_2)$: secondary time constant $r_2$: secondary resistance

Using the torque current command It* and the excitation current command Im* obtained as described above, a slip angular frequency ωs and a phase $\theta_1$ are obtained from the following equations (4) and (5), respectively.

$$\omega s = Ks \cdot (It^*/Im^*) \quad (4)$$

where $Ks = r_2/(M+l_2)$, $$\theta_1 = \tan^{-1}(It^*/Im^*) \quad (5)$$

The angular frequency (primary angular frequency) $\omega_1$ of the alternating current command can be obtained by adding the slip angular frequency ωs and the primary frequency command $\omega_1$. The instantaneous phase of the alternating current command can be obtained by integrating the primary angular frequency $\omega_1^*$.

The phase of the alternating current command can be obtained by adding the above instantaneous phase and the phase $\theta_1$, and the magnitude of the alternating current command $I_1$ can be obtained by adding. The current command generator generates three-phase alternating current commands iu*, iv*, iw* based on the above values.

In the current control means 70, the standard signals Vu*, Vv*, Vw* for generating the PWM signals shown in FIG. 4 (a) are generated using PI compensators so that the three-phase alternating currents iu, iv, iw respond to the alternating current commands (iu*, iv*, Iw*).

In the PWM signal generating means 90, the PWM signals PWMVu, PWMVn, PWMVw are obtained by comparing the standard signals (Vu*, Vv*, Vw*) with a triangular wave, and gate signals for six power elements composing the arms of the PWM inverter 3 are formed based on the PWM signals.

Figure 2:
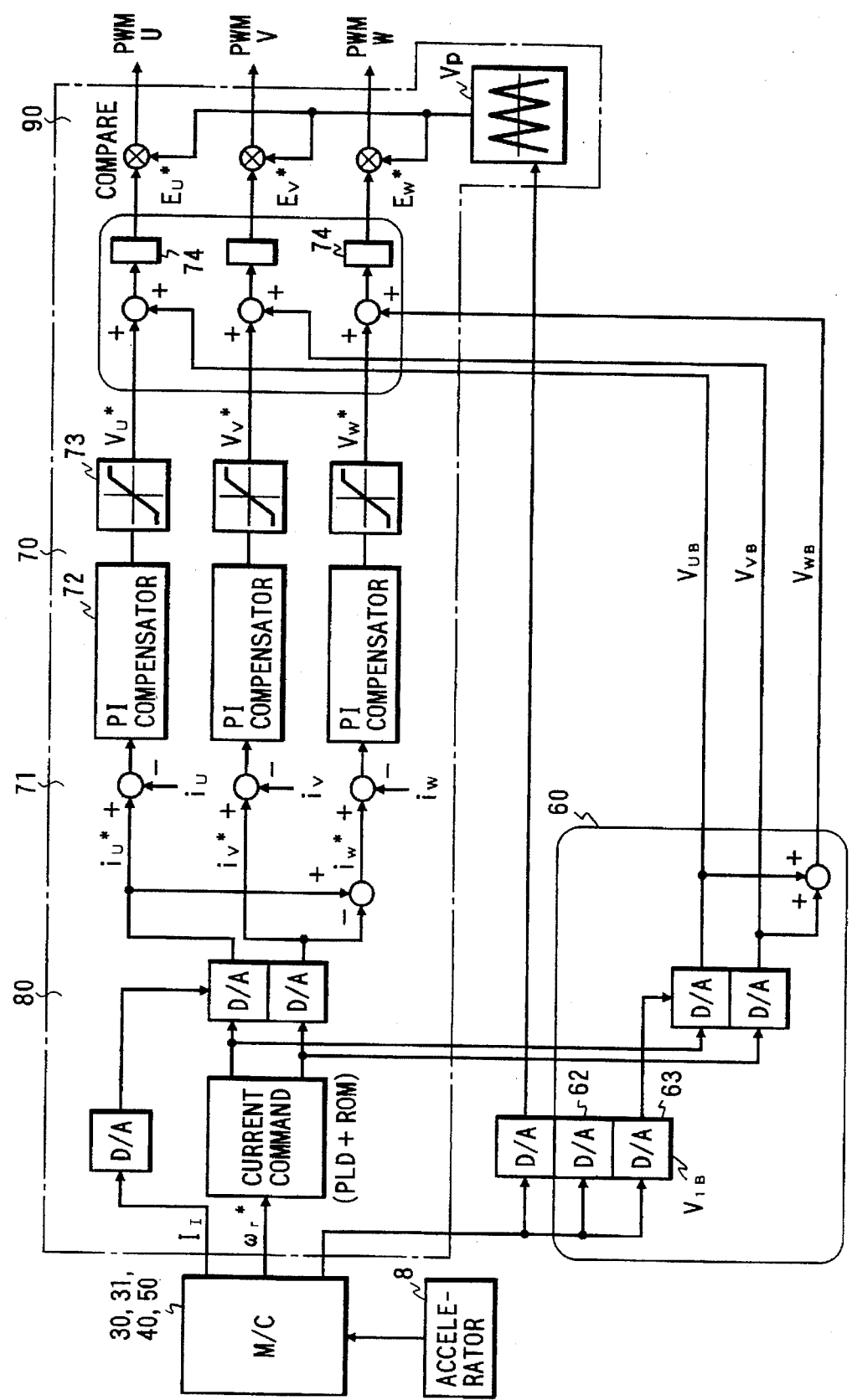
FIG. 2 is a diagram showing the construction of the controller in the control system for an electric vehicle of FIG. 1.
Figure 3:
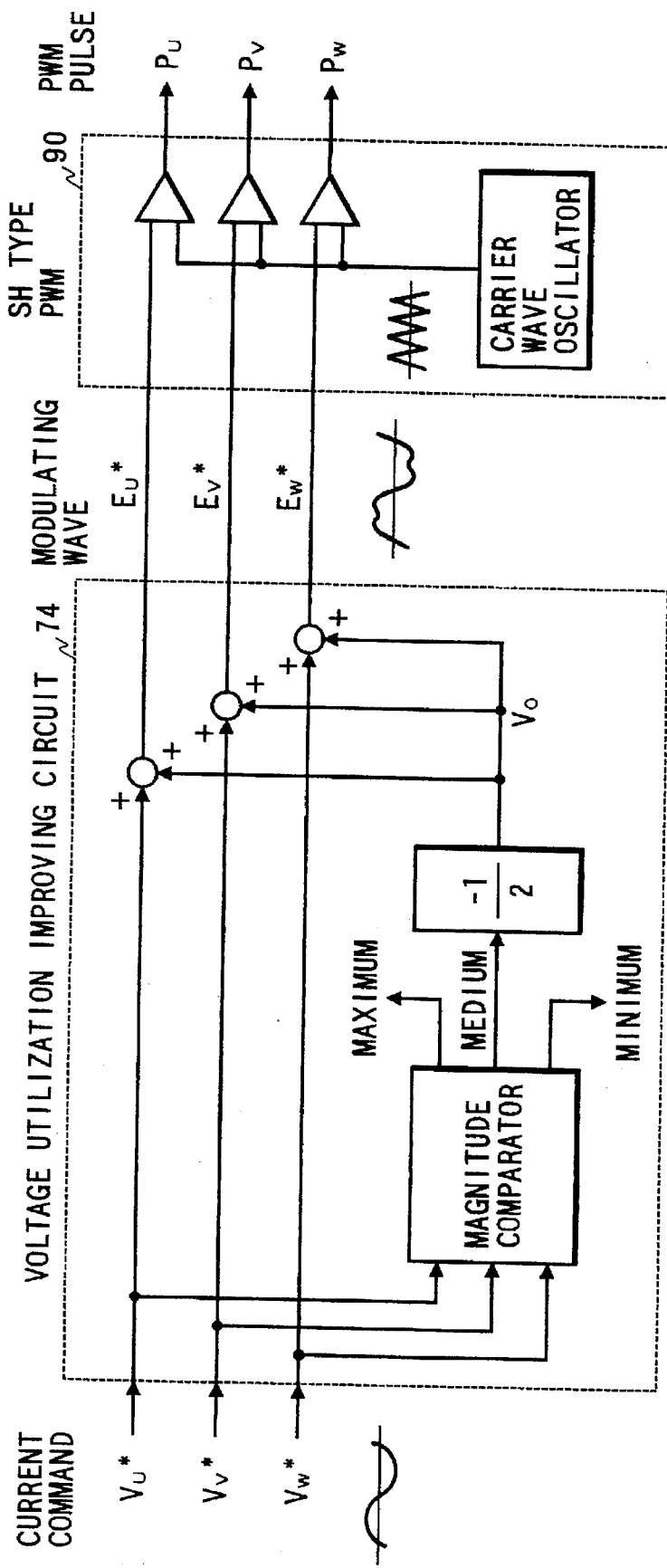
FIG. 3 is a diagram showing the details of the voltage utilization improving circuit of FIG. 2.

The construction of the controller 5 of FIG. 1 will be described below in detail, referring to FIG. 2. The torque command calculating means 30, the accelerator opening calculating means 31, the running back-up control circuit 40 and the vector control calculating means 50 are constructed using programs and memory of a micro-computer M/C.

The alternating current command generating means 80 has a D/A converting unit and a current command unit, and generates a current command i* (iu*, iv*, iw*) to the current control means 70 as shown in the equation (6) based on the alternating current command $I_1$ and the primary angular frequency $\omega_1^*$ corresponding to the output θA of the accelerator sensor.

$$iu^* = I_1 \sin \theta_1, \quad iv^* = I_1 \sin(\theta_1 - 2/3\pi), \quad iw^* = I_1 \sin(\theta_1 + 2/3\pi) \quad (6)$$

where $\theta = \int w_1 dt$.

The current control means 70 has an adding/subtracting unit 71, a PI (proportional+integrating) compensator 72, a limiter 73 and a voltage utilization improving circuit 74, and the voltage signals Eu*, Ev*, Ew* for generating the PWM signals are generated using the alternating current command i* (iu*, iv*, Iw*) and the motor current i (iu*, iv*, Iw*) so that the three-phase alternating motor currents iu, iv, iw respond to the alternating current commands. The voltage utilization improving circuit 74 is for utilizing the output voltage of the inverter effectively, and improves the output voltage by 15%.

The overall operation of the system will be described below. When the speed sensor 6, the current sensor 7 and the accelerator sensor 8 are normally operated, a control signal based on the output signal from the vector control calculating means 50 is generated and supplied to the inverter 3 since an abnormal signal is not generated from the running back-up control circuit 40. Therefore, at this time, the inverter 3 is in the vector control state by the feedback signal from the rotating speed sensor 6, and the alternating current motor 4 is accurately controlled corresponding to the commands from the accelerator and the like, and consequently running of the electric vehicle is properly controlled.

If for any reason an abnormality occurs in any one of the speed sensor 6, the current sensor 7 and the accelerator sensor 8, a back-up control voltage v1B is correspondingly output as an abnormal signal from the running back-up control circuit 40. As the result, the running back-up circuit 60 sets the limiter for the output of the current control means to zero and switches the control signal to the inverter 3 from a vector control signal (having been used) to a V/f voltage control signal.

Then the inverter 3 is in the V/f control state to control the speed of the alternating current motor 4, and the electric vehicle can continue to run with minimum necessary condition. In a case where the accelerator is abnormal, running ON/OFF is performed, for example, by an idling switch which is turned on at full closed state of the accelerator. Here, it is constructed that the back-up control voltage v1B as a command includes a command for the upper limit of rotating speed during running.

During ordinary running, the alternating voltage command is v*(vuB, wB, vwB)=0.

In running back-up mode, the micro-computer controls so that the running back-up control circuit 40 outputs the back-up control voltage v1B to the running back-up circuit 60 and the running back-up circuit 60 performs the V/f control which controls the voltage of the motor and the primary frequency in a proper relationship. That is, the output of the D/A converter 62 is set to zero (0) and the limiter 73 is set to zero (0). On the other hand, the output of the D/A converter 63 is set to v1B, and the voltage command v* (vuB, vvB, vwB) as shown by the equation (7) and in FIG. 4(b) is generated from the back-up control voltage v1B.

$$vuB = V1_1 \sin\theta_1, \quad vvB = V_1 \sin(\theta_1 - 2/3\pi), \quad vwB = V_1 \sin(\theta_1 + 2/3\pi) \quad (7)$$

The voltage utilization improving circuit 74 outputs voltage signals Eu*, Ev*, Ew* for generating the PWM signal from the voltage command v* (vuB, vvB, vwB).

In the PWM signal generating means 90, the voltage signals (Eu*, Ev*, Ew*) as shown in FIG. 4(c) are compared with a triangular wave to generate the output voltages shown in FIG. 4(d) for driving the six power elements composing the arms of the PWM inverter 3.

Therefore, according to the embodiment, even if an abnormal condition occurs in the sensor, it is possible to suppress a situation that the vehicle becomes incapable of running or a dangerous situation that the alternating current motor becomes out of control, and accordingly the vehicle can be always driven safely.

Figure 5:
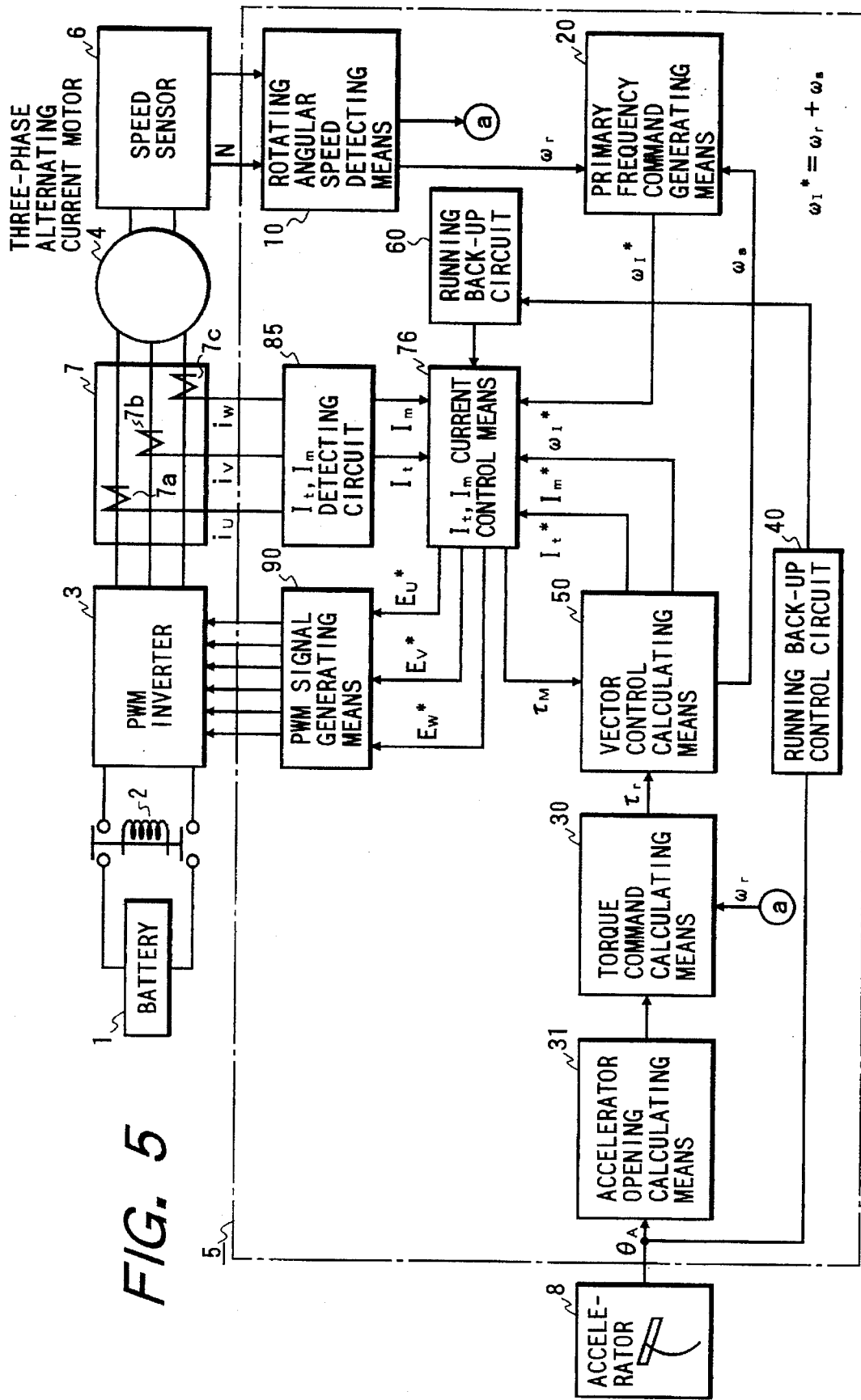
FIG. 5 is a block diagram of another embodiment of a control system for an electric vehicle in accordance with the present invention.

The present invention can be applied to a digital control system as well as to the analog control system as described above. FIG. 5 shows one of the embodiment.

A controller 5 has an It, Im current control means 76 and an It, Im current detecting means 85, and also has a running back-up control circuit 40, a vector control calculating means 50, a running back-up circuit 60 and a PWM signal generating means 90 as similar to the embodiment of FIG. 1.

In the normal state, the controller 5 receives rotating speed N of the motor, motor current i and degree of opening θA of the accelerator. In the torque command calculating means 30 a torque command τr is calculated based on θ and the rotating angular speed ωr. The primary frequency command generating means 20 calculates a primary angular frequency $\omega_1^*$, while the vector control calculating means 50 generates a torque current command It* and an excitation current command Im* based on an exciting motor command im and a motor torque τM. An It-Im current detecting means 85 supplies a torque current It and an excitation current Im obtained through d-q converting the three-phase alternating currents iu, iv, iw detected by the current sensors 7a, 7b, 7c to the current control means 76. In the current control means 76, standard signals Eu*, Ev*, Ew* for obtaining the motor toque πM are generated by executing an alternating voltage command calculating process using the primary angular frequency $\omega_1^*$, the alternating current command $I_1$ and so on, and a PWM signal is output from the PWM signal generating means 90. A variable frequency and variable voltage three-phase alternating voltage is formed from the direct current of the battery 1 using the inverter driven based on the PWM signal to control the torque of the three-phase alternating current motor 4. The current control means 76 has an adding/subtracting unit, a PI (proportional+integrating) compensator, a limiter and a ⅔ phase converter, and generates the voltage signals Eu*, Ev*, Ew* for generating the PWM signals.

In the PWM signal generating means 90, the voltage signals (Eu*, Ev*, Ew*) as shown in FIG. 4(c) are compared with a triangular wave to generate the output voltages shown in FIG. 4(d) for driving the six power elements composing the arms of the PWM inverter 3. Therefore, according to the embodiment, even if an abnormal condition occurs in the sensor, it is possible to suppress a situation that the vehicle becomes incapable of running or a dangerous situation that the alternating current motor becomes out of control, and accordingly the vehicle can be always driven safely.

According to the present invention, in an electric vehicle driving system using vector control, the vehicle can always safely run at failure of a sensor without using the output of the sensor.

Other objects, advantages and novel features of the present invention will become apparent from the following detailed description of the invention when considered in conjunction with the accompanying drawings.

What is claimed is:

1. A protection apparatus for an electric vehicle of the type comprising an inverter for converting a direct current electric power source of a battery to a variable voltage and variable frequency alternating current power source, a three-phase alternating current motor for driving the vehicle, a current sensor for detecting current flowing to said three-phase alternating current motor, a torque command calculator for determining a torque command of said three-phase alternating current motor based on a degree of opening of an accelerator detected by an accelerator sensor, an alternating current command generator for generating a current command to control current flowing to said three-phase alternating current motor based on said torque command and an output of said current sensor, a current control circuit for generating a voltage signal based on said current command and the current flowing to said three-phase alternating current motor, a limiter for limiting the voltage signal generated by said current control circuit and PWM signal generating means for generating a PWM signal to control said inverter based on an output from the limiter; said protection apparatus comprising:

a detector for detecting abnormal operation of said current sensor; and a back-up circuit responsive to detection of said abnormal operation for causing an output of said limiter to be set to zero, and for generating a voltage command based on a back-up control voltage output from said alternating current command generating means, said PWM signal generating means generating a PWM signal for control of said inverter using said voltage command.

2. A protection apparatus for an electric vehicle of the type comprising an inverter for converting a direct current electric power source of a battery to a variable voltage and variable frequency alternating current power source, a three-phase alternating current motor for driving the vehicle, a current sensor for detecting current flowing to said three-phase alternating current motor, a torque command calculator for determining a torque command of said three-phase alternating current motor based on a degree of opening of an accelerator detected by an accelerator sensor, a current control circuit for generating a voltage signal based on said torque command and an output of said current sensor a limiter for limiting the voltage signal generated by said current control circuit, and a PWM signal generator for generating a PWM signal to control said inverter based on an output from the limiter; said protection apparatus comprises:

a detector for detecting abnormal operation of said current sensor;

a back-up circuit responsive to detection of said abnormal operation for causing an output of said limiter to be set to zero, and for generating a voltage command based on a back-up control voltage output from said alternating current command generator, said PWM signal generator for generating a PWM signal for control said inverter using said voltage command.

3. A protection apparatus for the electric vehicle according to claim 1, wherein said current control circuit comprises a voltage utilization improving circuit for converting said voltage command to a three-phase voltage command.

4. A method for protecting an electric vehicle of the type comprising an inverter for converting a direct current electric power source of a battery to an alternating current power source, a three-phase alternating current motor for driving the vehicle, a current sensor for detecting current flowing to said three-phase alternating current motor, a torque command calculator for determining a torque command of said three-phase alternating current motor based on a degree of opening of an accelerator detected by an accelerator sensor, an alternating current command generator for generating a current command to control the current flowing to said three-phase alternating current motor based on said torque command and an output of said current sensor, a current control circuit for generating a voltage signal based on said current command and the current flowing to said three-phase alternating current motor, a limiter for limiting the voltage signal generated by said current control circuit, and a PWM signal generator for generating a PWM signal to control said inverter based on an output from the limiter, wherein a back-up signal for driving said three-phase alternating current motor is generated at an abnormal state of said sensor to make the electric vehicle capable of driving; said method comprising the steps of:

in response to said back-up signal, causing an output of said limiter to be set to zero, generating a voltage command based on a back-up control voltage output from said alternating current command generator, and causing said PWM signal generator to generate a PWM signal for control said inverter using said voltage command.

5. A method for protecting an electric vehicle of the type comprising an inverter for converting a direct current electric power source of a battery to an alternating current power source, a three-phase alternating current motor for driving the vehicle, a current sensor for detecting current flowing to said three-phase alternating current motor, a torque command calculator for determining a torque command of said three-phase alternating current motor based on a degree of opening of an accelerator detected by an accelerator sensor, a current control circuit for generating a voltage signal based on said torque command and an output of said current sensor, a limiter for limiting the voltage signal generated by said current control circuit and a PWM signal generator for generating a PWM signal to control said inverter based on said voltage signal, wherein a back-up signal for driving said three-phase alternating current motor is generated at an abnormal state of said sensor to make the electric vehicle capable of driving; said method comprising the steps of:

detecting abnormal operation of said current sensor;

setting an output of said limiter to zero;

generating a voltage command based on a back-up control voltage output from said alternating current command generator; and said PWM signal generator generating a PWM signal for control of said inverter using said voltage command.

6. A protection apparatus for the electric vehicle according to claim 2, wherein said current control circuit comprises a voltage utilization improving circuit for converting said voltage command to a three-phase voltage command.

* * * * *